United States Patent [19]
Lai et al.

[11] Patent Number: 6,145,016
[45] Date of Patent: Nov. 7, 2000

[54] SYSTEM FOR TRANSFERRING FRAME DATA BY TRANSFERRING THE DESCRIPTOR INDEX DATA TO IDENTIFY A SPECIFIED AMOUNT OF DATA TO BE TRANSFERRED STORED IN THE HOST COMPUTER

[75] Inventors: Po-Shen Lai, San Jose; Autumn Jane Niu, Sunnyvale; Jerry Chun-Ken Kuo, San Jose, all of Calif.

[73] Assignee: Advanced Micro Devices, Inc., Sunnyvale, Calif.

[21] Appl. No.: 09/146,251
[22] Filed: Sep. 3, 1998
[51] Int. Cl.[7] ..................................... G06F 13/14
[52] U.S. Cl. .................................. 710/4; 710/22; 710/35; 710/40; 710/55; 709/208; 709/212; 709/217; 709/222; 711/3
[58] Field of Search ............................. 710/3, 4, 22, 35, 710/40, 55; 711/3; 709/208, 212, 217, 222

[56] References Cited

U.S. PATENT DOCUMENTS

| | | | |
|---|---|---|---|
| 5,081,547 | 1/1992 | Howell | 360/31 |
| 5,341,476 | 8/1994 | Lowell | 709/200 |
| 5,490,283 | 2/1996 | Chin | 710/73 |
| 5,828,901 | 10/1998 | O'Toole et al. | 710/22 |
| 5,889,778 | 3/1999 | Huscroft et al. | 370/395 |
| 6,041,328 | 3/2000 | Yu | 707/10 |

*Primary Examiner*—Thomas C. Lee
*Assistant Examiner*—Thuan Du

[57] ABSTRACT

A network interface device includes a random access memory used as a transmit and receive buffer for transmission and reception of data frames between a host computer bus and a packet switched network. The network interface device includes read and write controllers for each of the transmit and receive buffers, where each write controller operates in a clock domain separate from the corresponding read controller. The memory management unit also includes a synchronization circuit that controls arbitration for accessing the random access memory between the read and write controllers. The synchronization circuit determines the presence of a stored frame in the random access memory by asynchronously comparing write counter and read counter values. The memory management unit also includes a descriptor management unit for controlling DMA transfers between the transmit and receive buffers and the system memory. The descriptor management obtains descriptor lists from system memory based on descriptor index data supplied by the host CPU and verified as valid by the descriptor management, and releases control of the descriptor lists by writing to status locations in system memory.

19 Claims, 9 Drawing Sheets

SYSTEM FOR TRANSFERRING FRAME DATA BY TRANSFERRING THE DESCRIPTOR INDEX DATA TO IDENTIFY A SPECIFIED AMOUNT OF DATA TO BE TRANSFERRED STORED IN THE HOST COMPUTER

BACKGROUND OF THE INVENTION

1. Technical Field

The present invention relates to network interfacing and more particularly, to methods and systems for transferring data between a host system memory and a buffer memory in a network interface device configured for accessing Ethernet media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by the MAC, and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional problem caused by the buffering of data between the clock domain of the host computer and the clock domain of the network interface device is buffer overflow or underflow. For example, buffer overflow can occur when the time domains between the host bus and the network media are uncontrollable to the extent that data is stored in the buffer at a rate faster than the data can be removed, resulting in an overflow situation. Conversely, underflow occurs if data is removed from the FIFO buffer faster than the data can be supplied.

Hence, the non-synchronous relationship between the host bus clock domain and the network clock domain have required the necessity of FIFO buffers to compensate for timing discrepancies between the host computer and the network.

Network interface devices configured for transferring data between host system memory and the FIFO buffer using DMA transfers have typically used descriptor entries, stored in system memory, to provide information needed by the DMA management unit on the network interface device to transfer either transmit data or receive data between the system memory and the network interface device. In particular, the descriptor entries are typically organized as ring structures in system memory, and include one descriptor ring for transmit data and another descriptor ring for receive data. Each descriptor entry is used to describe a single buffer. Since a frame may occupy one or more buffers, multiple descriptor entries may be used to identify multiple buffers storing data for a given data frame. Hence, for each transfer of frame data (i.e., packet data), the network interface device needs to perform two DMA transfers from system memory, namely one DMA transfer to obtain descriptor information related to the frame data, and a second DMA transfer for the actual stored frame data. Hence, the network interface device relied upon software drivers, executable by the host processor, to maintain descriptor data in system memory related to transmit and receive data.

One disadvantage in prior implementations of descriptor-based buffer management schemes was that the network interface device needed to regularly poll the system memory locations storing the descriptor information in order to determine whether the descriptor entries have changed. If the network interface device detected a change in the descriptor entries stored in the system memory, the network interface device would recognize that another transfer of data was necessary. For example, a change in the transmit descriptor entries would cause the network interface device to initiate a transmit descriptor entry access in order to transfer transmit data from the system memory to the network interface device for transmission on the network medium.

Hence, the network interface device conventionally would periodically poll the current receive and transmit descriptor entries in order to ascertain "ownership," namely whether the driver software executed by the host computer was responsible for updating the descriptor entries, or whether the network interface device needed to access the descriptor entries in order to perform a data transfer. The periodic polling of the current receive and transmit descriptor entries was used particularly if there was no network channel activity, and there was no pre- or post-receive or pre- or post-transmit activity being performed by the network interface device.

This polling operation, however, reduced the throughput of the host bus, especially if the receive or transmit descriptor entries had not been updated. In addition, the system driver would need to fetch the descriptor information to determine whether data was released, followed by changing the descriptor at the same location. Hence, the multiple accesses by either the software driver or the network interface device from the same system memory location would substantially reduce the throughput of the host bus.

SUMMARY OF THE INVENTION

There is a need for an arrangement for transferring frame data between a host system memory and a network interface buffer memory via a host bus, where descriptor management for DMA transfers of data is configured to optimize the throughput of the host bus.

There is also a need for an arrangement in a network interface device, where the fetching of descriptor data elements from system memory is efficiently managed in a manner that eliminates accessing of the host bus without a valid transfer of data.

There is also a need for an arrangement that minimizes the occurrences of ineffective accesses of the host bus by the network interface device, where the validity of information related to descriptor data elements stored in system memory is verified before accessing the host bus.

These and other needs are attained by the present invention, where descriptor index data is received from the host computer, which identifies a specified amount of descriptor data elements stored in the system memory relative to a prescribed system address. The validity of the received descriptor index data is determined by the network interface device before fetching the descriptor data elements identifying a corresponding portion of the frame data. The descriptor data elements are selectively fetched by the network interface device from the system memory in response to the determined validity of the received descriptor index data, by fetching a specified number of descriptor data elements specified by the received descriptor index data. Hence, the received descriptor index data is used to identify for the network interface device the number of descriptor data elements that are available in system memory for use by the network interface device (i.e., released by the system driver). The specified number of descriptor data elements are fetched from the system memory also based on a grant from a DMA arbitration unit in the network interface device, configured for prioritizing access of the host bus by the network interface device to avoid overflow or underflow conditions in the network interface buffer memory. The fetched descriptor data elements are then used to transfer a selected amount of frame data between the host system memory and the network interface buffer memory. The network interface device also stores status data in the system memory based on the successful transfer of the frame data, enabling the software driver to recognize the release of the corresponding descriptors back to the driver.

The above-described arrangement provides a novel architecture that optimizes efficiency in host bus transfers by identifying the release of descriptors by the software driver based on the reception of the descriptor index data and the determination of the validity of the received descriptor index data. Moreover, use of the DMA arbitration unit to prioritize the access of the host bus enables the network interface device to selectively prioritize between access of the host bus for transmit descriptor data elements, receive descriptor data elements, transmit data, or receive data, based on contending priorities within the network interface device.

According to one aspect of the present invention, a method in a network interface device for transferring frame data between a host system memory and a network interface buffer memory via a host bus comprises receiving descriptor index data from the host computer, the descriptor index data identifying a specified amount of descriptor data elements stored in the system memory relative to a prescribed system address, each descriptor data element identifying a corresponding portion of the frame data, determining a validity of the received descriptor index data, selectively fetching the descriptor data elements based on the determined validity, comprising (1) requesting a host bus transfer from a DMA arbitration unit on the network interface device, and (2) fetching the specified number of descriptor data elements from the system memory relative to the prescribed system address based on a grant from the DMA arbitration unit, transferring a selected amount of the frame data between the host system memory and the network interface buffer memory via the host bus based on at least a corresponding one of descriptor data elements fetched from the system memory, and storing status data in the system memory based on the successful transfer of the frame data in the retrieving step.

According to another aspect of the present invention, a network interface device for transferring frame data between a host system memory in a host computer and a network media comprises a random access buffer memory, a bus interface unit for accessing the host system memory via a host bus, and a memory controller configured for transferring the frame data between the host system memory and the random access buffer memory, the memory controller comprising (1) a descriptor control register for storing descriptor index data supplied by the host computer, the descriptor index data identifying a specified amount of descriptor data elements stored in the host system memory relative to a prescribed host system memory address, each descriptor data element identifying a corresponding portion of the frame data, (2) a descriptor management unit for determining a validity of the received descriptor index data, the descriptor management unit including logic for (a) selectively fetching the descriptor data elements based on the determined validity and the specified amount of descriptor data elements, (b) selectively transferring a selected amount of the frame data between the host system memory and the random access buffer memory based on at least a corresponding one of the fetched descriptor data elements, and (c) storing status data based on the successful transfer of the frame data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 1, 1A and 1B are block diagrams illustrating an exemplary network interface device including a synchronization circuit for controlling buffer memory controllers according to an embodiment of the present invention.

BEST MODE FOR CARRYING OUT THE INVENTION

The present invention will be described with the example of a network interface device in a packet switched network, such as an Ethernet (IEEE 802.3) network. A description will first be given of a network interface architecture, followed by the arrangement for transferring frame data between a host system memory and a network interface buffer memory. It will become apparent, however, that the present invention is also applicable to other network interface device systems.

NETWORK INTERFACE ARCHITECTURE

Figure 1A:
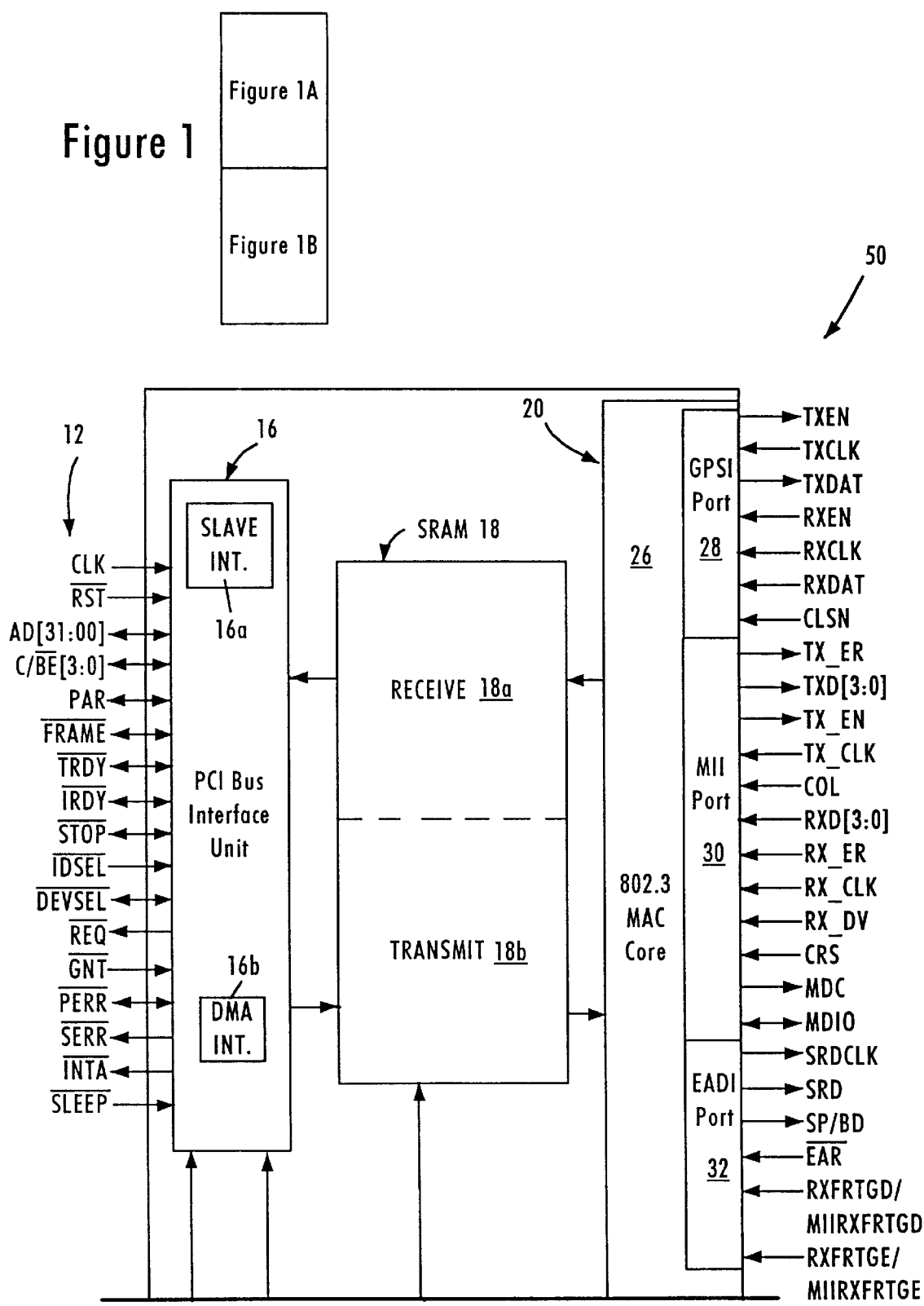
Figure 1B:
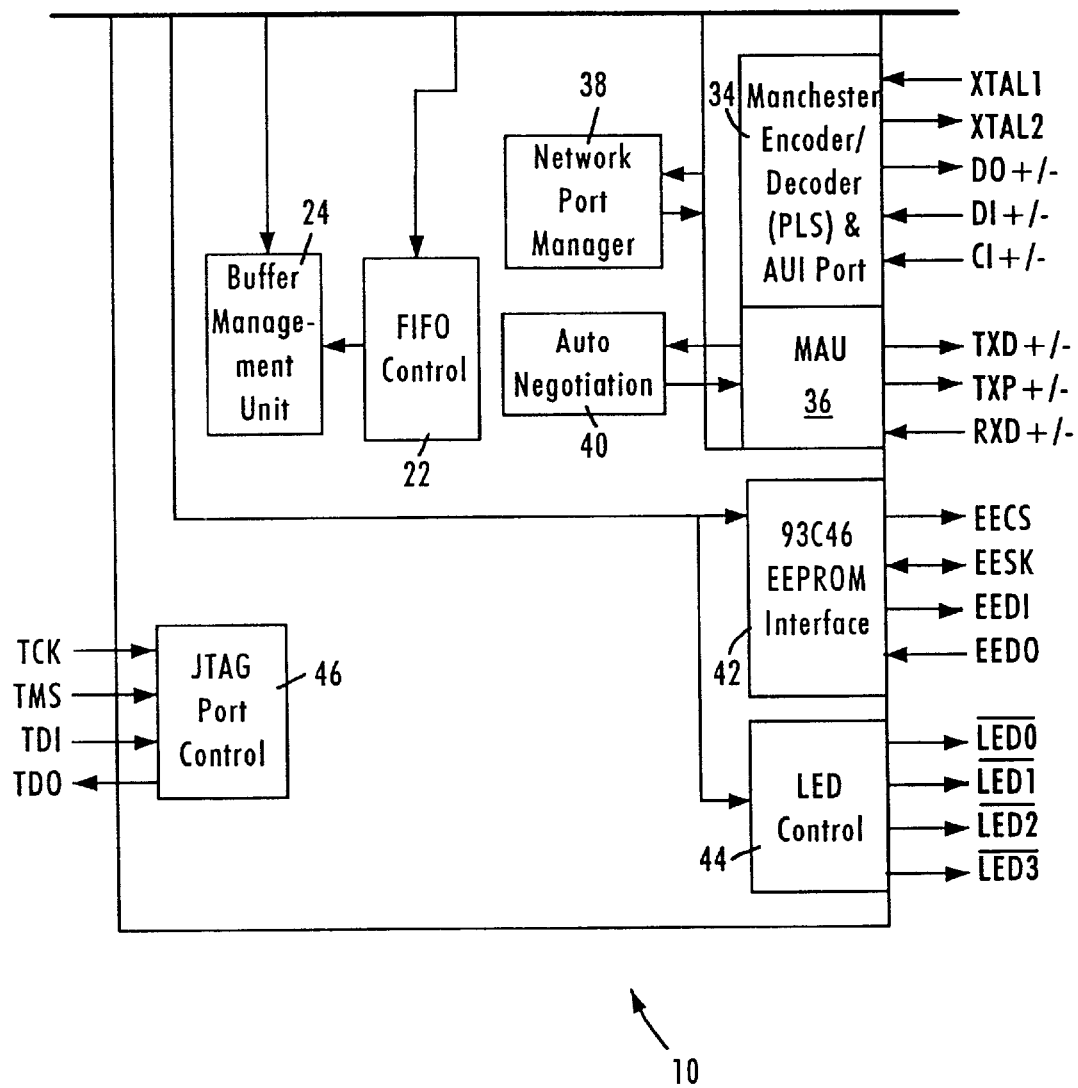

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MI) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

MEMORY MANAGEMENT ARCHITECTURE

Figure 2:
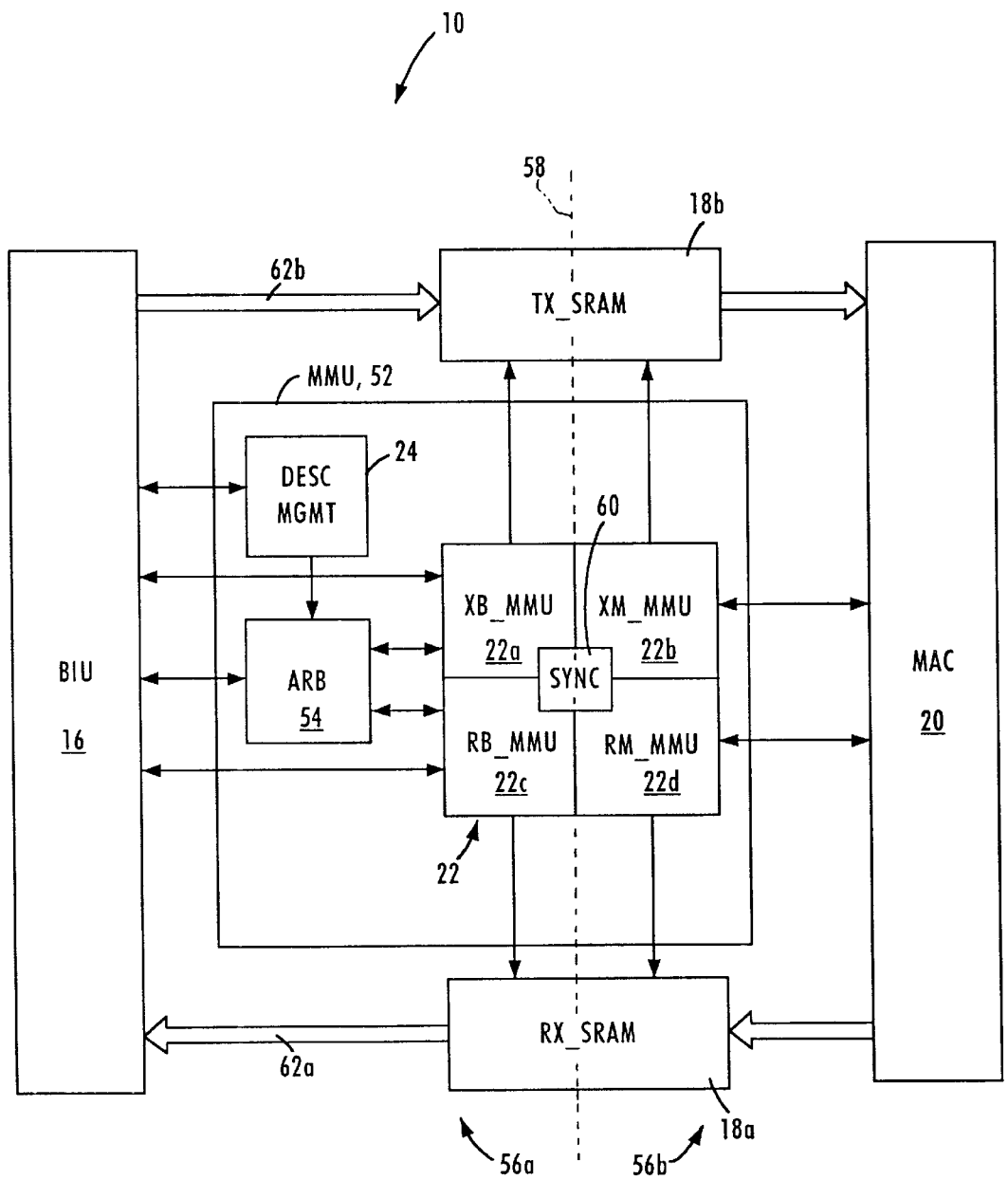
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56a.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_

MMU) 22*d*, and a synchronization circuit 60. The XB_MMU 22*a* and the RM_MMU 22*d* operate as write controllers configured for writing frame data into the SRAMs 18*b* and 18*a*, respectively. The XB_MMU 22*a* and the RB_MMU 22*c* operate according to the PCI bus clock (CLK). The RM_MMU 22*d* operates according to the receive MAC clock (RX_CLK) received by the MAC 20, and the XM_MMU 22*b* operates under the control of the MAC transmit clock (TX_CLK) received by the MAC 20. The XM_MMU 22*b* and the RB_MMU 22*c* operate as read controllers configured for reading frame data from the SRAMs 18*b* and 18*a*, respectively. Hence, receive data from the MAC 20 is written into the RX_SRAM 18*a* under the control of the write controller 22*d* synchronous to the receive clock (RX_CLK) in the network clock domain 56*b*. Frame data stored in the RX_SRAM 18*a* is read and output to the BIU 16 via data path 62*a* under the control of the receive-data read controller 22*c*, which reads the frame synchronous to the PCI bus clock signal.

Similarly, transmit data to be output onto the network by the MAC 20 is written into the TX_SRAM 18*b* via data path 62*b* under the control of the transmit-data write controller 22*a*, configured for writing the frame data synchronized to the PCI bus clock (CLK). The stored transmit data is read and output from the TX_SRAM 18*b* to the MAC 20 under the control of the transmit-data read controller 22*b* according to the MAC transmit clock (TX_CLK) within the network clock domain 56*a*.

The presence of two separate clock domains 56*a* and 56*a* in writing and reading to a random access memory 18 requires that the write controller and read controller devices be coordinated and synchronized to ensure that no contention issues arise due to the relative independence of the two clock domains 56*a* and 56*b*. The SRAM MMU 22 includes a synchronization circuit 60 that asynchronously monitors the status of the RX_SRAM 18*a* and the TX_SRAM 18*b*, enabling the memory controllers to read and write to the memory 18 between the two clock domains 56*a* and 56*b*. Thus, problems that would ordinarily arise between the two clock domains in the individual memory management units 22*a*, 22*b*, 22*c* and 22*d* are avoided by use of the synchronization circuit 60 according to a prescribed arbitration logic.

According to the disclosed embodiment, the synchronization circuit 60 includes a read counter and a write counter for each transmit SRAM 18*b* and receive SRAM 18*a*, where each counter is configured for counting a number of written (or read) frames by changing a single bit of a counter value in response to a corresponding signal from the associated MMU controller. Hence, the synchronization circuit 60 can asynchronously determine the number of stored frames in the RX_SRAM 18*a* and the TX_SRAM 18*b*, as well as the amount of free space in the TX_SRAM 18*b* or stored data bytes in the RX_SRAM 18*a*.

As described below, the status of the RX_SRAM 18*a* and TX_SRAM 18*b* is used by the arbitration unit 54 to prioritize the transfer of transmit data and receive data via the PCI bus 12.

DESCRIPTOR MANAGEMENT

Descriptor data elements are used by the network interface device 10 to control the transfer of frame data between the host system memory and the network interface buffer memory 18. As described below, a software driver executable by the host CPU controls the writing of transmit data into system memory, and retrieving receive data from the system memory for use by the host CPU. Storage of the transmit frame data and receive frame data in the host system memory is controlled by the software driver, which writes descriptor lists in system memory, where each descriptor list includes at least one descriptor data element identifying at least a portion of frame data stored (or to be stored) in system memory. Once the system driver writes the descriptor lists in host memory, the driver releases the descriptor lists to the network interface device 10, described below, enabling the network interface device 10 to fetch the descriptor data element in order to identify the appropriate location and conditions for transmit or receive data. Once the network interface device 10 has completed transferring the data based on the corresponding descriptor data elements, the network interface device releases the descriptor data elements, described below, enabling the software driver to update the descriptor lists in system memory for new frame data.

Figure 3:
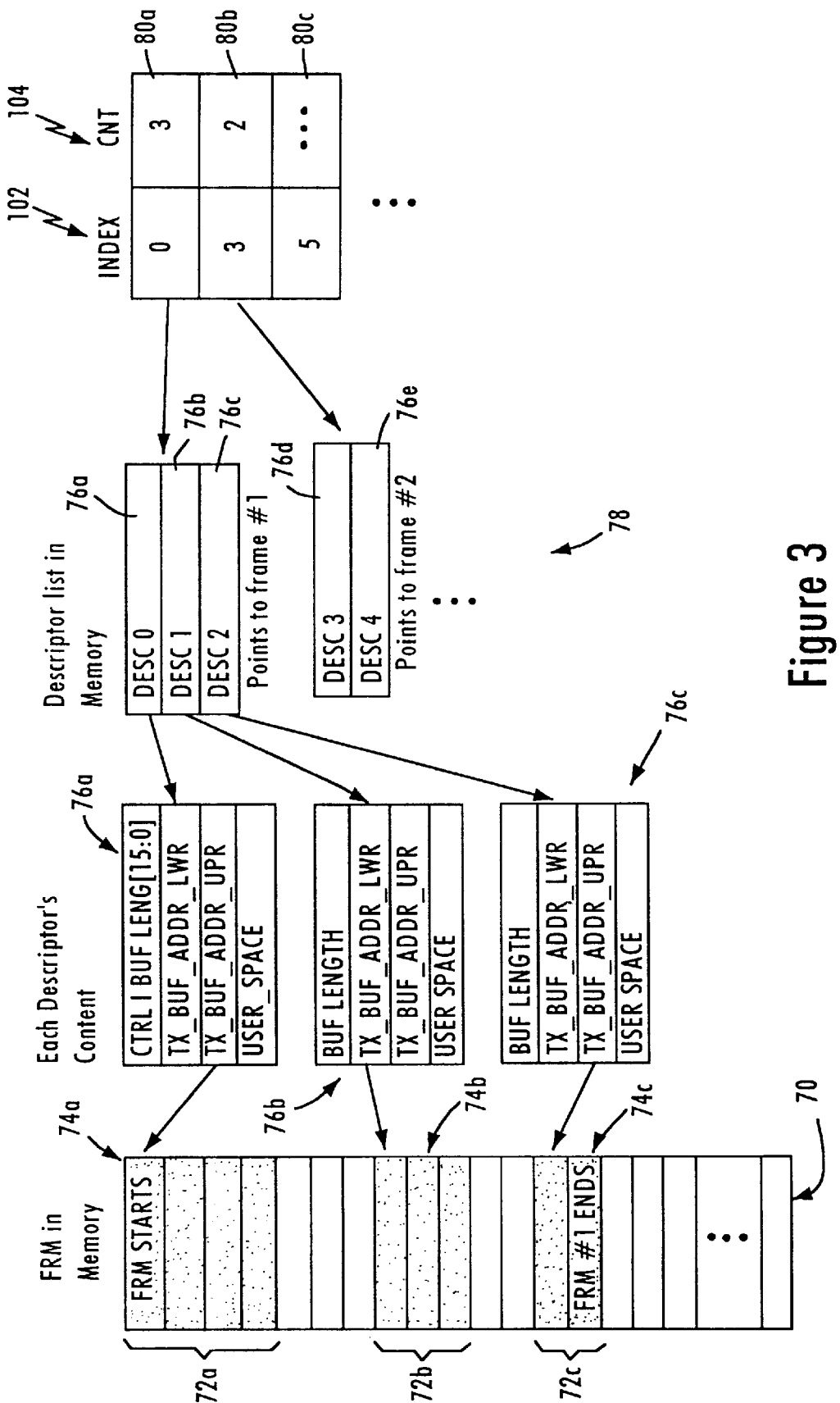
FIG. 3 is a diagram illustrating a relational structure between received descriptor index data, descriptor data elements, and frame data transferred by the network interface according to an embodiment of the present invention.

FIG. 3 is a diagram illustrating the relationship between descriptor data elements, frame data, and descriptor index data used by the network interface device 10 to fetch the descriptor data elements, according to an embodiment of the present invention.

As shown in FIG. 3, a system memory 70 includes frame data 74 at system memory locations 72. The frame data may be fragmented into a plurality of portions 74*a*, 74*b*, 74*c*, such that each frame data fragment 74 has its own corresponding system memory location 72. Each frame data fragment 74 has a corresponding descriptor data element 76. Hence, the descriptor data elements 76*a*, 76*b*, and 76*c* point to respective frame data fragments 74*a*, 74*b*, 74*c*. As described below, the descriptor management unit 24 uses the descriptor data elements 76*a*, 76*b*, and 76*c* to fetch the first transmit frame 74 from the respective memory location 72*a*, 72*b*, and 72*c*.

According to the disclosed embodiment, each of the descriptors 76 are stored in contiguous memory locations in the system memory 78. Hence, the system driver, upon writing the descriptor data elements 76 into system memory 78, releases the control over the descriptor data elements 76 by writing descriptor index data 80 to a register 82 on the MMU 52, shown in FIGS. 4 and 5, indicating that the descriptors 76 are available.

Figure 4:
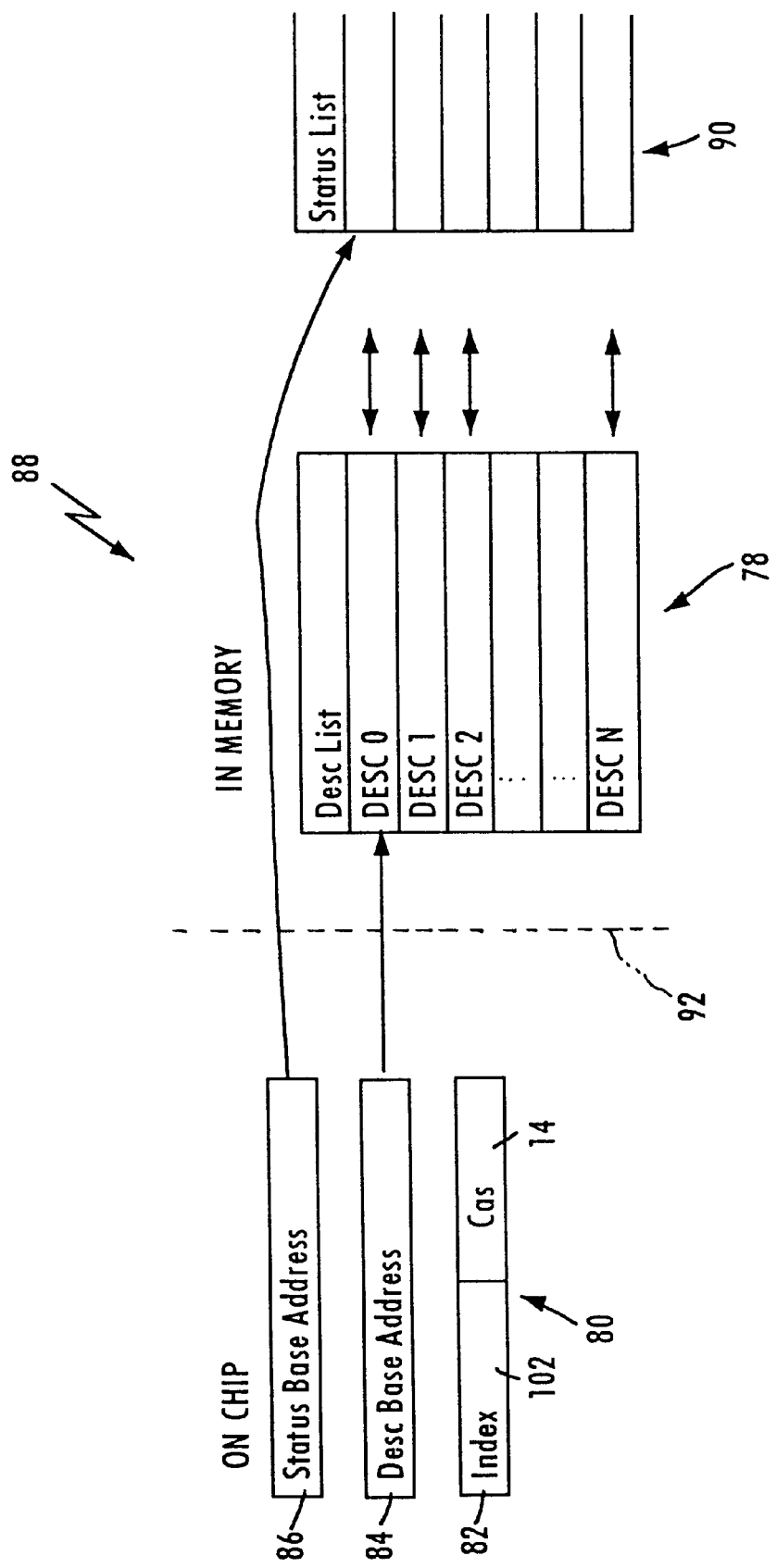
FIG. 4 is a diagram illustrating system memory accesses based on information stored in registers within the network interface of FIG. 2.

FIG. 4 is a diagram illustrating registers on the network interface device 10 that are used to access the descriptor list 78 and a status list 90 in system memory. As shown in FIG. 4, the network interface device 10 includes registers 82, 84, and 86 for accessing the descriptor list 78 and the status list 90 in system memory. The dashed line 92 represents the interface between the network interface device 10 and the system memory 92. As shown in FIGS. 3 and 4, the system memory stores the descriptor list 78, the status list 90, and the frame data 74.

Figure 5:
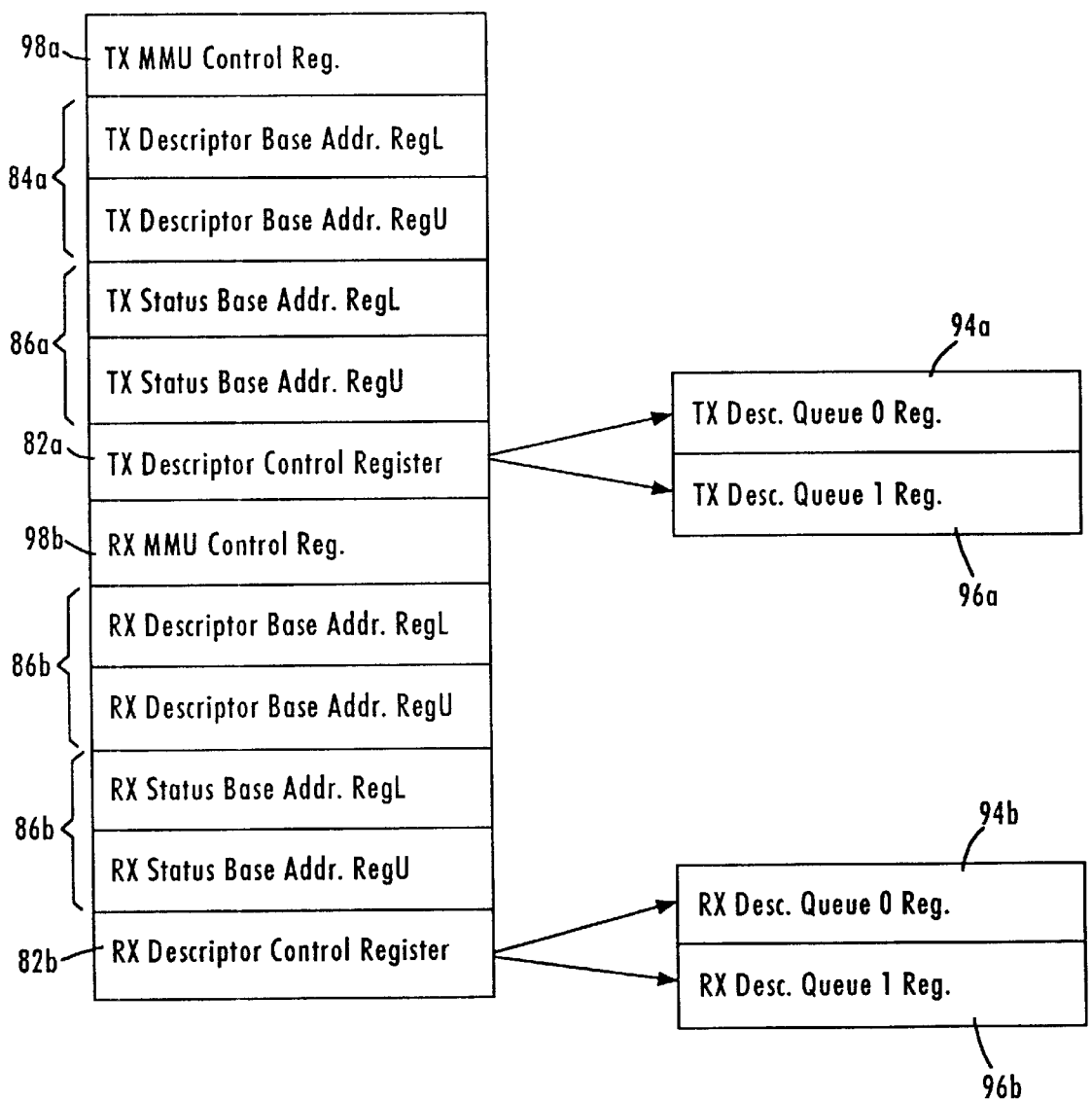
FIG. 5 is a diagram illustrating in detail the memory management unit registers in the memory management unit of FIG. 2.

As shown in FIG. 4 and in further detail in FIG. 5, the MMU 52 includes a descriptor control register 82 configured for storing the descriptor index data 80 supplied by the driver software in the host computer. The MMU 52 also includes a descriptor base address register 84 that identifies the base address for the first descriptor in the descriptor list 78 (e.g., descriptor 0), and a status base address register 86 for storing the system base address for the status list 90. As shown in FIG. 5, the MMU can include the registers 82, 84, and 86 for each of the transmit data and receive data. In addition, the registers 84 and 86 have lower and upper 32-bit registers, enabling 64-bit based addressing of the system memory, if necessary.

As described above, the descriptor data elements 76 in the descriptor list 78, as well as the status elements of the status list 90, are stored in contiguous system memory locations. Hence, a wrap-around condition could theoretically occur in the event that the descriptor data elements 76 reach the end of the list 78 with respect to the allocated system memory space. Although the software driver could utilize a wrap-around addressing scheme, such an arrangement may cause addressing difficulties by the network interface 10. For example, a PCI burst transfer would require two separate bursts to access data from non-contiguous system memory locations.

According to the disclosed embodiment, wrap-around addressing is avoided by providing for two descriptor queues in the network interface device 10. As shown in FIG. 5, the MMU 52 includes a first descriptor queue 94 and a second descriptor queue 96, where the MMU 52 selectively transfers the stored descriptor index data 80 from the descriptor control register 82 to one of the queue registers 94 or 96, in response to detecting a "new queue" condition.

For example, as shown in FIG. 3, the descriptor data element includes an index value 102 and a count value (CNT) 104. The index value 102 specifies the position of the corresponding descriptor data element relative to a prescribed system address. For example, FIG. 3 shows a descriptor data element 80a having an index value equal to zero, and a count value 104 equal to three. The index value 0 specifies that the first descriptor value 76a pointed to by the descriptor data element 80a is located at the base address in system memory identified by the descriptor base address register 84. The count value 104 specifies the number of descriptors assigned to the particular descriptor index data 80a. Hence, the count value (CNT=3) specifies the number of descriptor data elements (e.g., 76a, 76b, and 76c) identified by the corresponding descriptor index data 80a, and the index value 102 identifies the relative location of the first descriptor data element relative to the descriptor base address 84.

According to the disclosed embodiment, the software driver follows specific rules in writing the descriptor index data 80 to the descriptor control register 82. The descriptor management unit 24 uses these rules to determine the validity of the received descriptor index data written in the appropriate descriptor control register 82, and to determine whether a new index queue should be started. In particular, the descriptor management unit 24 determines whether the new index value 102 equals zero. If the new index value written in the index field 102 equals zero, as shown in descriptor index data entry 80a, then the descriptor index data is identified as starting a new queue (i.e., a new descriptor list). The descriptor management unit 24, in response to detecting a new zero index value, switches from storing from an existing queue 94 to storing the zero-index queue into the next queue register 96.

For example, assume that the descriptor management unit 24 had been transferring descriptor index data 80 from the transmit descriptor control register 82a to the transmit descriptor queue zero register 94a. Assume the register 94a includes a 16-bit index value of 1555, and a 16-bit count value of 5. If the descriptor management unit 24 then detects the overwriting in the register 82a with the descriptor index 80a having a zero index value, the descriptor management unit 24 will not overwrite the existing value in register 94a, but rather will begin using the queue 1 register 96a. The descriptor management unit 24 will continue to use the queue 1 register 96a until detecting another descriptor index data element 80 having a zero index value. Hence, the descriptor management 24 can maintain two separate index queues for each of the transmit and receive descriptors, by switching descriptor queues in response to detecting a zero index value 102.

The second rule associated with writing to the descriptor control register 82 is that the new index value must equal the sum of the prior index value and the prior non-zero count value. In addition, another rule is that the count value can never equal zero. As shown in FIG. 3, the descriptor index data 80b has an index value 102 that equals the sum of the prior index value (INDEX=0) and the prior non-zero count value (CNT=3) of the prior descriptor index data 80a. Hence, the descriptor management 24 determines the receive descriptor index data 80b is valid, and will therefore overwrite the index value 80a stored in the transmit queue 1 register 96a.

Hence, the network interface device transfers frame data between the host system memory 88 (e.g., the frame data 74 and the system memory 70) by first receiving descriptor index data 80 from the host computer stored in the register 82. The descriptor management 24 determines the validity of the descriptor index data 80, and writes the received descriptor index data 80 from the descriptor control register 82 to a selected one of a queue register 94 or 96, based on whether the received descriptor index data 80 specifies a new queue is to be formed (i.e., whether the index value INDEX equals zero). The descriptor management 24 then fetches the descriptor data element 76 pointed to by the descriptor index data 80 stored in the appropriate queue register (94 or 96), and stores the fetched descriptor data elements 76 into internal registers in the descriptor management 24, described below with respect to FIG. 7. The descriptor management 24 then transfers a selected amount of the frame data 74 between the host system memory and the network interface buffer memory 18 via the host PCI bus 12 based on a corresponding one of the descriptor data elements 76 fetched from the system memory. Once a transfer is complete, the descriptor management 24 stores status data in the system memory 90 based on the successful transfer of the frame data 74, releasing control of the associated descriptors back to the driver software. The host processor, e.g., the driver software, can also monitor the status of the transfer by reading the MMU control registers, which are read only for the software driver (TX_MMU control register 92a and RX_MMU control register 98b).

As described below, the disclosed embodiment has the particular advantage of minimizing the amount of memory space in the network interface 10 by selectively fetching the descriptor data elements from system memory. In particular, the reception of the descriptor index data from the host computer enables the network interface 10 to detect the release of control by the system driver software by the corresponding descriptor data element 80. As described below, the use of an arbitration unit 54 to prioritize the fetching of transmit or receive descriptor data elements, or transmit or receive data via the PCI bus 12, enables priority-based PCI bus accesses, minimizing overflow or underflow conditions in the TX_SRAM 18b or the RX_SRAM 18a. In addition, use of status registers to store the status information for the corresponding descriptor data element enables the network interface device 10 to conveniently pass control of corresponding descriptor data elements back to the driver software. Hence, the driver software can access the corresponding status list 90 to determine the status of corresponding descriptor elements 78, or access the appropriate MMU control register 98 (shown in FIG. 5) to determine which particular descriptor data element is currently being serviced by the network interface device 10.

Figure 6A:
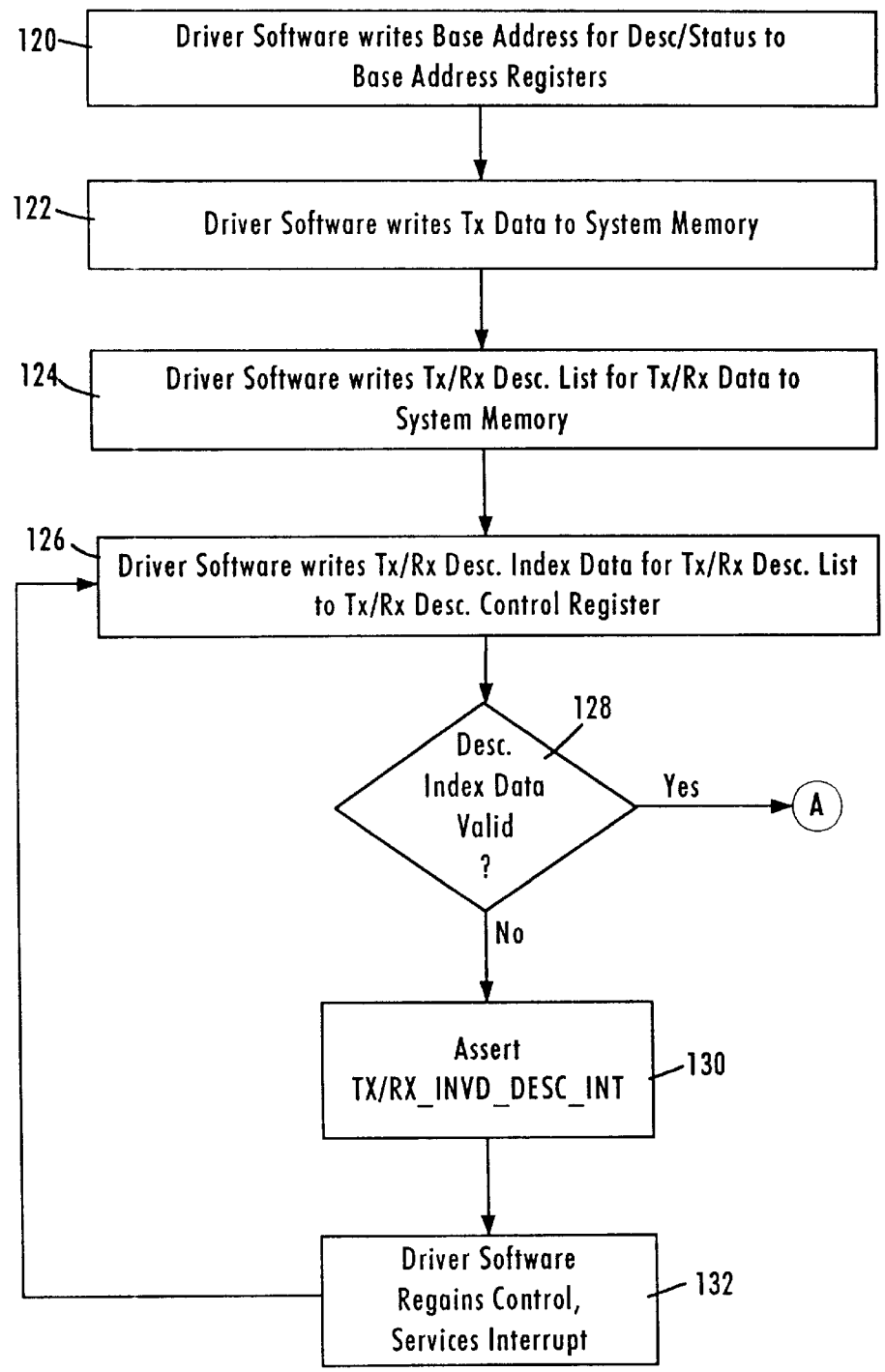
FIGS. 6A and 6B summarize the method in the network interface device for transferring frame data between the host system memory according to an embodiment of the present invention.
Figure 6B:
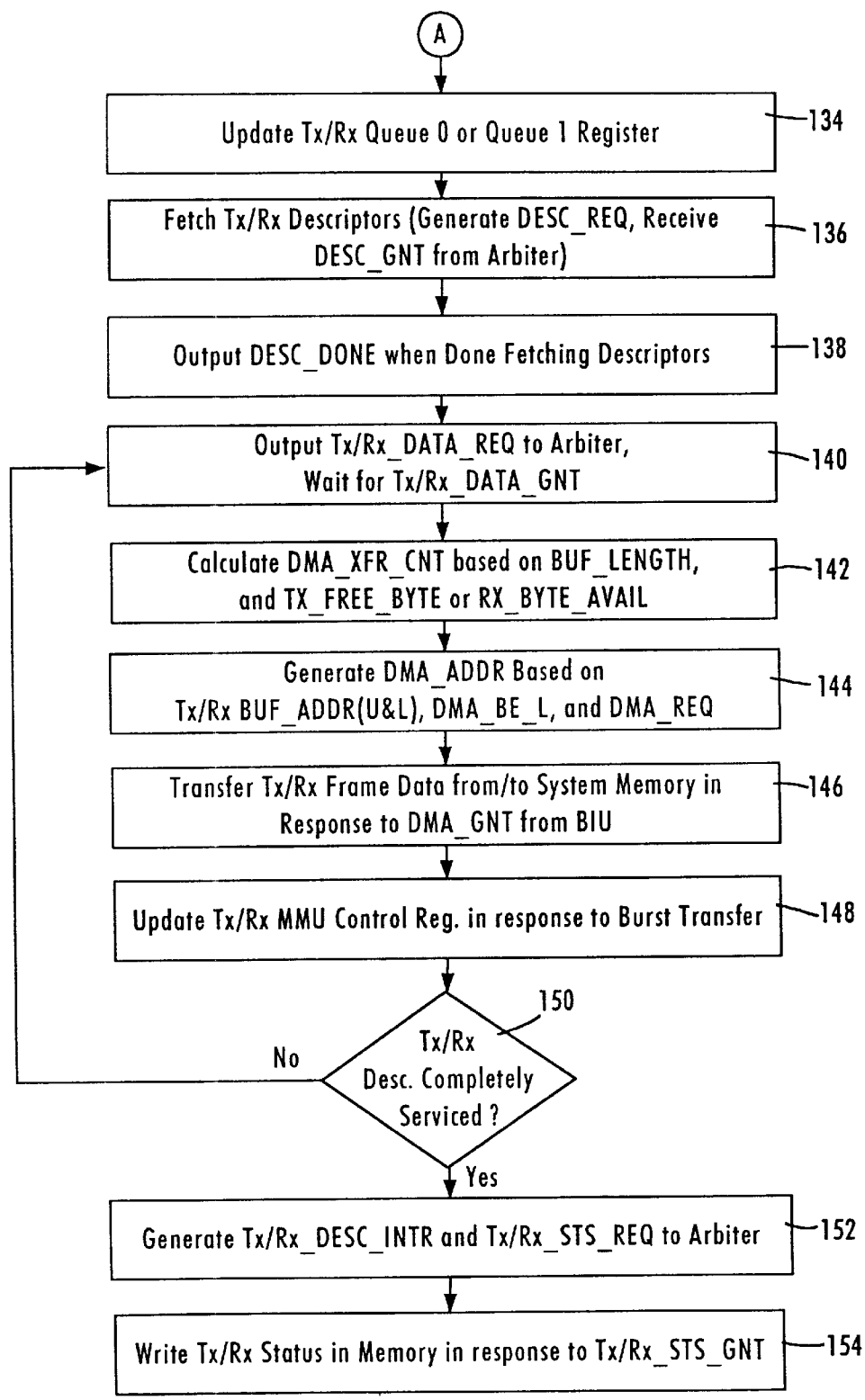

FIGS. 6A and 6B summarize a method in a network interface device for transferring frame data between the host system memory 88 and the network interface buffer memory 18 according to an embodiment of the present invention. The disclosed arrangement is applicable for both transmit data and receive data.

As shown in FIG. 6A, the method begins in step 120, where the driver software writes the base address for the descriptor list 78 and the status list 90 into base address registers 84 and 86, respectively. Specifically, the 64-byte system address for the transmit descriptor list is stored in the transmit descriptor base address registers 84a, including the upper and lower 32-bit registers. The base address for the descriptor list is similarly written to the receive descriptor base address registers 86b, shown in FIG. 5. The system base address for the transmit status list is written to the transmit status base address registers 86a, and the base address for the receive status list is written to registers 86b. According to the disclosed embodiment, each 128-bit descriptor 78 has a single 32-bit status word entry for transmit data, and a double word (64-bit) entry for receive data.

Following writing the base address for the descriptor and status lists for both transmit and receive data to the appropriate base address registers 84 and 86, the driver software writes transmit data 74 to system memory 70 in step 122, and writes the corresponding transmit descriptor list 76 to system memory in step 124. The driver software reserves a portion of the system memory 88 for the receive data stored in the RX_SRAM 18a, and writes the receive descriptor list identifying the reserved system memory locations in a memory location separate from the transmit descriptor list. Hence, the transmit and receive operations are essentially the same, except that the receive descriptor list identifies reserved memory locations in system memory for receive data, whereas the transmit descriptor list identifies memory locations that actually store transmit data. In both instances, however, the descriptor management 24 transfers a selected amount of the frame data, either receive frame data or transmit frame data, between the host system memory and the network interface buffer memory based on the corresponding receive or transmit descriptor data elements fetched from system memory.

Following the writing of transmit or received descriptor data elements in the system memory 88 (e.g., transmit descriptor elements 78 written into system memory location 78), the driver software writes transmit or receive descriptor index data 80 for the corresponding descriptor list 78 to the transmit or receive descriptor control register 82 in step 126. As described above, the writing of the descriptor index data 80 to the corresponding descriptor control register 82 releases control of the descriptors identified in that descriptor index from the driver software to the network interface device 10.

Figure 7:
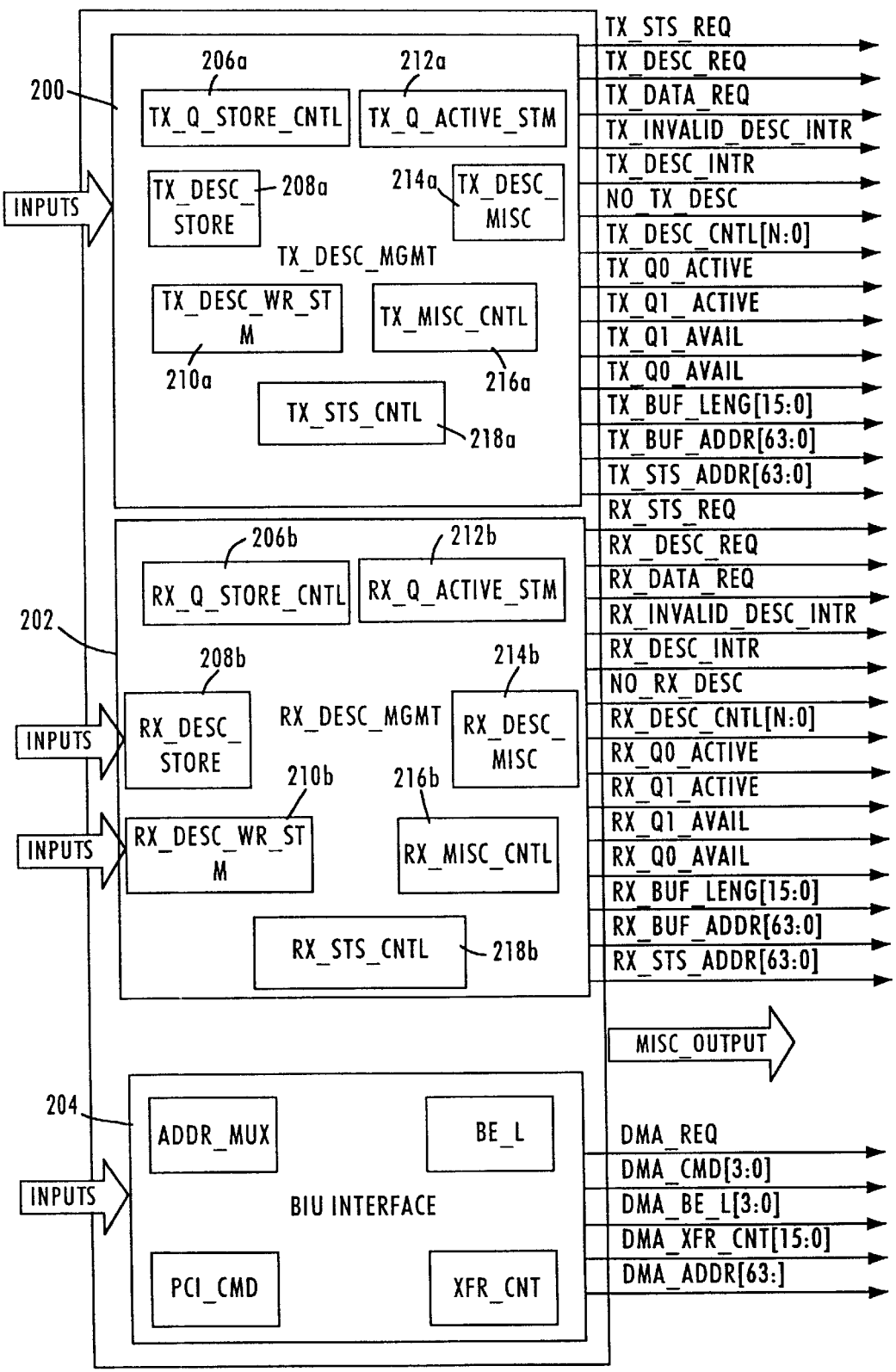
FIG. 7 is a diagram illustrating in detail the descriptor management unit of FIG. 2.

In response to receiving the descriptor index data 80 in the appropriate descriptor control register 82, the descriptor management unit 24 determines the validity of the received descriptor index data stored in registers 82a and/or 82b. FIG. 7 is a block diagram illustrating in detail the descriptor management 24, which includes a transmit control portion 200, a receive control portion 202, and a BIU interface control portion 204. The portions 200 and 202 each include a queue store controller 206 for determining a validity of the descriptor index data 80. The appropriate controller 206 of the descriptor management 24 determines in step 128 the validity of the descriptor index data by first determining the presence of a non-zero count value 104, that identifies a specified number of descriptor data elements. The controller 206 also determines the validity of the received descriptor index data in step 128 by determining if the index value 102 of the receive descriptor index 80 is a non-zero value. If the index value 102 is a zero index value, then the controller 206 starts a new queue by switching from a first queue (e.g., 94a) storing the last received descriptor index data, to a new queue 96a in response to detecting the zero index value (see step 134).

If the index value 102 is a non-zero value, however, the queue store controller 206 determines if the non-zero index value of the descriptor index value equals the sum of the prior index value and the prior non-zero count value. For example, as shown in FIG. 3, the transmit queue store controller 206 determines, assuming transmit descriptor 80b is written into register 82a, whether the index value (index=3) is equal to the sum of the index and count values of the last received descriptor index data 80a. If the sum of the prior index value and the prior non-zero count value does not equal the non-zero index value of the current descriptor index data, the controller 206 asserts an invalid interrupt in step 130, for example the TX_INVD_DESC_INT interrupt signal for the transmit descriptor stored in register 82a, or the RX_INVD_DESC_INT interrupt signal for the descriptor index data stored in register 82b. The software driver, in response to detecting the interrupt on the PCI bus, regains control in step 132, and services the interrupt in step 132. The software driver will then make any necessary corrections, including rewriting the descriptor lists in system memory, after which the driver will release the written descriptor lists by writing to the descriptor control registers, as described above in step 126.

As described above, the queue store controller 206 updates the transmit and receive queue registers 94 or 96 in step 134 by overwriting the last received descriptor index data, assuming the received descriptor index data includes a non-zero index value (step 134).

Once the transmit queue store controller 206a or the receive queue store controller 206b updates the corresponding queue register 94 or 96, the corresponding descriptor write state machine 210 fetches the transmit or receive descriptor data elements 76 from the system memory 78 in step 136 based on the corresponding descriptor base address in the appropriate register 84, offset by the index value 102 in the appropriate queue registers 94 and 96. Specifically, the transmit descriptor write state machine 210 generates a descriptor request (DESC_REQ) to the arbiter 54, requesting the access of transmit descriptor data from system memory. The arbitration unit 54 is configured for prioritizing between PCI bus requests for transmit descriptor data (TX_DESC_REQ), receive descriptor requests (RX_DESC_REQ), transmit data requests (TX_DATA_REQ), and receive data requests (RX_DATA_REQ). The arbiter 54 prioritizes these requests based on the amount of free space in the TX_SRAM 18b (TX_FREE_BYTE) and the amount of stored receive data (RX_BYTE_AVAIL) in the RX_SRAM 18a. Hence, the arbiter 54 controls the contention encountered during multiple requests for the PCI bus by the descriptor management unit 24 for both transmit data and receive data.

Once the descriptor management 24 receives a grant (TX_DESC_GNT or RX_DESC_GNT) from the arbiter, the descriptor management 24 initiates a DMA transfer from system memory. Specifically, the transmit descriptor write state machine 210 outputs a 64-byte DMA address based on the system address stored in the descriptor base address register 84, offset by the index value 102 in the appropriate queue registers 94 or 96. The transmit descriptor write state machine 210 also outputs a DMA transfer count that specifies the burst size based on the count value 104 in the appropriate queue register 94 or 96. For example, if the descriptor index data 80a includes a count value CNT=3, then the burst size equals the appropriate number to fetch the three descriptors 76a, 76b, and 76c. The transmit descriptor write state machine 210 also outputs a byte enable (DMA_BE_L) signal indicating the byte alignment on the PCI bus, and a generic DMA request (DMA_REQ) to the BIU 16. The BIU 16 in response issues a request on the PCI bus 12, according to PCI protocol, resulting in the fetching of the specified number of descriptor data elements from the system memory to internal storage registers 208 in the descriptor management 24.

Once the transmit descriptor write state machine 210 completes fetching the specified number of descriptor data elements, the transmit descriptor write state machine 210 outputs a done signal (DESC_DONE) in step 138 to the arbiter, indicating that the PCI transfer of the descriptor data elements is completed.

As shown in FIG. 7, the descriptor management blocks 200 and 202 each include a descriptor storage unite 208, configured as a 32×32 array of flip-flops for storing up to 8 descriptors.

Once the transmit descriptor write state machine 210 has completed fetching the transmit descriptor data, the transmit queue store controller 206 stores the actual fetched descriptor data elements into the transmit descriptor storage 208. The transmit miscellaneous controller 216 then reads the first fetched descriptor data element 76, and initiates a DMA transfer of a frame data 74 in step 140 by outputting a transmit data request (TX_DATA_REQ) to the arbiter 54, and waiting for a grant signal (TX_DATA_GNT) from the arbiter 54. In response to receiving a grant signal from the arbiter 54, the transmit miscellaneous controller 216 in step 142 calculates the DMA transfer count (DMA_XFR_CNT) based on the buffer length (BUF_LENGTH) specified in the descriptor 76 as shown in FIG. 3, and based on the network interface buffer memory storage information, for example the amount of free space in the transmit SRAM 18b (TX_FREE_BYTE) specified by the synchronization block 60, or the amount of available byte in the RX_SRAM 18a (RX_BYTE_AVAIL) for receive transfers. The controller 216 in the descriptor management 24 then generates a DMA address (DMA_ADDR) in step 144 based on the buffer address specified in the descriptor data element (e.g., TX_BUF_ADDR(U&L), the byte enable value (DMA_BE_L). The controller 216 also outputs the generic DMA request (DMA_REQ) in step 144 to the BIU 16 for a PCI transfer of data from system memory to the appropriate network interface buffer memory 18.

In response to receiving a grant signal from the BIU 16 based on a grant signal detected on the PCI bus, the descriptor management 24 (e.g., the controller 216) controls transfer of the frame data from system memory 70 to the transmit SRAM 18b in step 146. The descriptor management 24 updates the TX_MMU control register 98a and the appropriate queue register 94 or 96 during the burst transfer, such that the count value identified in descriptor index data 80a is decremented each time the frame data corresponding to a particular data element $76_i$ is fetched from system memory into the buffer 18. Once the descriptor management 24 detects in step 150 that a transmit or receive descriptor data element (e.g., DESC 0 76a) has been completely serviced by the descriptor management 24, the descriptor management 24 generates a descriptor interrupt (TX_DESC_INTR) to internal control registers in the MMU 52 indicating that corresponding descriptor $76_i$ has been serviced. The MMU 24 also generates a transmit status request (TX_STS_REQ) to the arbiter 54, requesting a transfer of status information corresponding to the serviced descriptor to the status list 90 in system memory in order to release control of the serviced descriptor to the driver software. The arbiter 54 generates a transmit status grant (TX_STS_GNT), causing the descriptor management 24 to perform a PCI write in step 154 to the descriptor list 90 based on the status base address stored in register 86, and the index value stored in the appropriate queue register.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface device for transferring frame data between a host system memory and a network interface buffer memory via a host bus, the method comprising:

receiving descriptor index data from the host computer, the descriptor index data identifying a specified amount of descriptor data elements stored in the system memory relative to a prescribed system address, each descriptor data element identifying a corresponding portion of the frame data;

determining a validity of the received descriptor index data;

selectively fetching the descriptor data elements based on the determined validity, comprising:

(1) requesting a host bus transfer from a DMA arbitration unit on the network interface device, and (2) fetching the specified number of descriptor data elements from the system memory relative to the prescribed system address based on a grant from the DMA arbitration unit;

transferring a selected amount of the frame data between the host system memory and the network interface buffer memory via the host bus based on at least a corresponding one of descriptor data elements fetched from the system memory; and storing status data in the system memory based on the successful transfer of the frame data in the retrieving step.

2. The method of claim 1, wherein the validity determining step comprises determining a presence of a nonzero count value, identifying the specified number of descriptor data elements, in the descriptor index data.

3. The method of claim 2, wherein the validity determining step further comprises determining a presence of one of a nonzero index value and a zero index value, the one index value corresponding with the nonzero count value in the descriptor index data.

4. The method of claim 3, wherein the validity determining step further comprises comparing the nonzero index value of the descriptor index data with a prior index value and a prior nonzero count value corresponding to a last received descriptor index data contiguously preceding the received descriptor index data.

5. The method of claim 4, wherein the comparing step comprises determining if a sum of the prior index value and the prior nonzero count value equals the nonzero index value.

6. The method of claim 5, further comprising storing the received descriptor index data in a first queue register by overwriting the last received descriptor index data, in response to the determined validity of the nonzero index value and the nonzero count value.

7. The method of claim 6, wherein the fetching step includes fetching a first of the descriptor data elements from a first system memory location based on the prescribed system address and the nonzero index value.

8. The method of claim 7, wherein the fetching step further comprises fetching a contiguous group of the descriptor data elements up to the specified number from system memory locations contiguously following the first memory location, based on the nonzero count value.

9. The method of claim 5, further comprising generating an interrupt to the host computer in response to the determining step determining an invalidity of the received descriptor index data.

10. The method of claim 3, further comprising:
if the received descriptor index data is valid and the one index value is a nonzero index value, storing the received descriptor index data in a first queue register by overwriting a last received descriptor index data contiguously preceding the received descriptor index data; and
if the received descriptor index data is valid and the one index value is a zero index value, storing the received descriptor index data in a second queue register distinct from the first queue register.

11. The method of claim 2, wherein the step of fetching the specified number of descriptor data elements comprises:
outputting a first DMA address based on the prescribed system address and an index value in the received descriptor data; and
outputting a first DMA count value based on the nonzero count value and a prescribed number of system memory locations used to store the corresponding descriptor data element.

12. The method of claim 11, wherein the transferring step comprises:
outputting a second DMA address based on an identified system address in the corresponding one descriptor data element; and
outputting a second DMA count value based on a buffer length value in the corresponding one descriptor data element, and network interface buffer memory storage information.

13. The method of claim 12, wherein the network interface buffer memory is a random access transmit buffer for storing transmit data for transmission on a network, the method further comprising:
receiving free bytes information as said network interface buffer memory storage information from an asynchronous buffer monitoring circuit, the second DMA count value step including selecting a minimum of the free bytes information and the nonzero count value as the second DMA count value.

14. The method of claim 12, wherein the network interface buffer memory is a random access receive buffer for storing receive data received from a network, the method further comprising:
receiving stored bytes information as said network interface buffer memory storage information from an asynchronous buffer monitoring circuit, the second DMA count value step generating the second DMA count value based on the stored bytes information.

15. A network interface device for transferring frame data between a host system memory in a host computer and a network media, comprising:
a random access buffer memory;
a bus interface unit for accessing the host system memory via a host bus; and
a memory controller configured for transferring the frame data between the host system memory and the random access buffer memory, the memory controller comprising:
(1) a descriptor control register for storing descriptor index data supplied by the host computer, the descriptor index data identifying a specified amount of descriptor data elements stored in the host system memory relative to a prescribed host system memory address, each descriptor data element identifying a corresponding portion of the frame data,
(2) a descriptor management unit for determining a validity of the received descriptor index data, the descriptor management unit including logic for:
(a) selectively fetching the descriptor data elements based on the determined validity and the specified amount of descriptor data elements;
(b) selectively transferring a selected amount of the frame data between the host system memory and the random access buffer memory based on at least a corresponding one of the fetched descriptor data elements; and
(c) storing status data based on the successful transfer of the frame data.

16. The network interface device of claim 15, wherein the descriptor management unit generates an interrupt to the host computer in response to detecting a zero count field in the stored descriptor index data.

17. The network interface device of claim 16, wherein the descriptor management unit includes a first queue register and a second queue register, the descriptor management unit selectively storing the stored descriptor index data in the one of the first and second queue registers in response to detecting a zero index field in the stored descriptor index data.

18. The network interface device of claim 15, wherein the memory management unit further comprises a synchronization circuit configured for asynchronously determining a storage status of the random access memory, the descriptor management unit selecting the amount of the frame data for transfer based on (1) length information in the one fetch descriptor data element identifying the length of the corresponding frame data portion, and based on (2) the storage status.

19. The network interface device of claim 18, wherein the memory management unit further comprises an arbitration unit for granting access to the descriptor management unit, for transferring the selected amount of the frame data, based on the determined storage status of transmit frame data and receive frame data portions of the random access buffer memory.

* * * * *